United States Patent Office 3,115,038
Patented Dec. 24, 1963

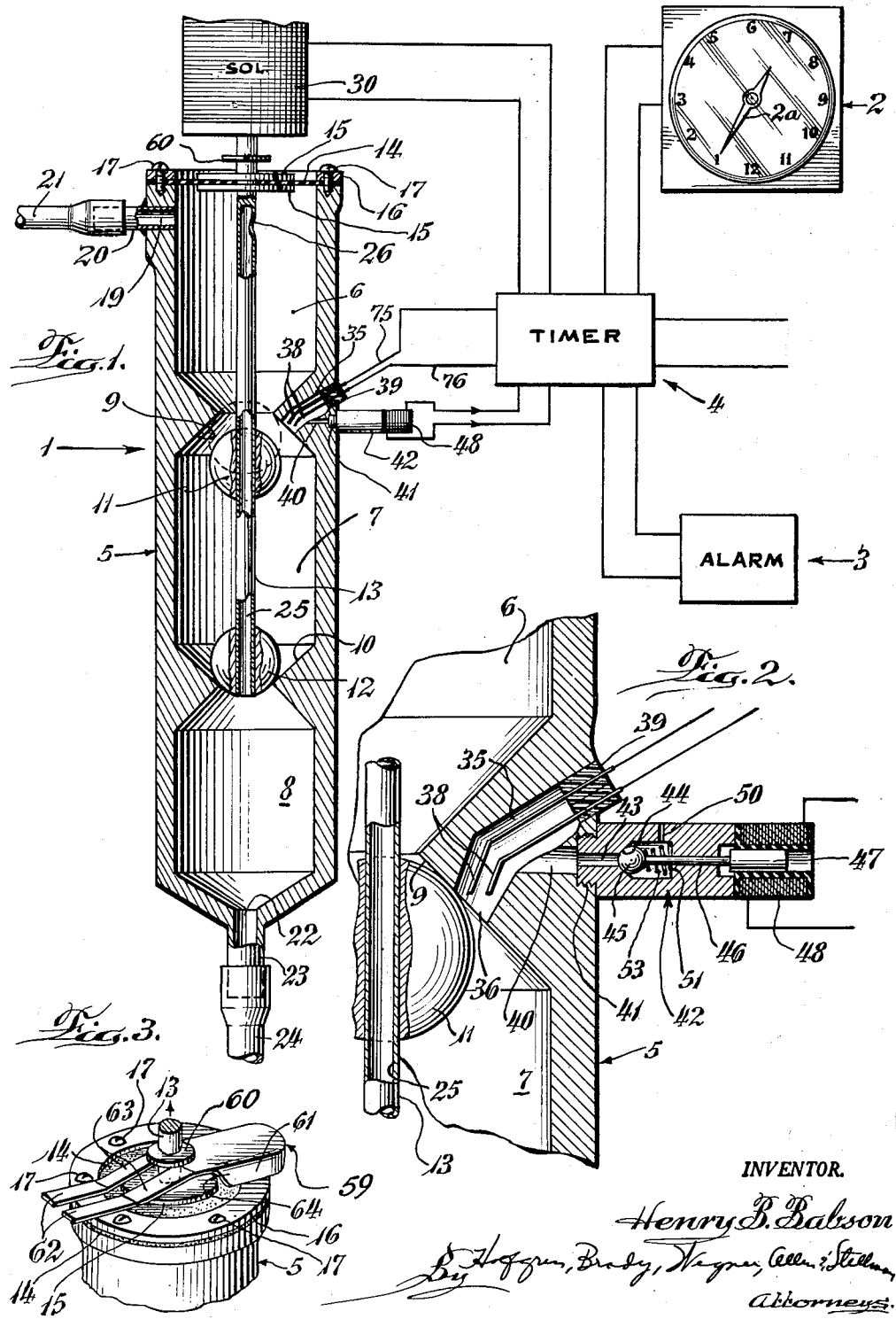

3,115,038
MILK FLOW MEASURING APPARATUS
Henry B. Babson, Chicago, Ill., assignor to Babson Bros. Co., a corporation of Illinois
Filed Oct. 25, 1960, Ser. No. 64,783
5 Claims. (Cl. 73—223)

This invention relates to carry-away milking systems, and more particularly to a measuring apparatus for carry-away milking systems.

Carry-away milking systems are becoming increasingly popular with dairy farm operators, at least in part because of the efficiency of such systems and the reduction in the manual labor required in their operation. Such systems normally use individual milking machines for each of a number of cows being milked at one time, with each milking machine discharging the milk into a carry-away milk line. The efficient operation of a dairy farm requires a high degree of sanitation and the keeping of adequate records. Adequate records of milk production of each cow should be kept on a continuing basis so that the low producers may be culled from the herd and exceptional producers may be selectively bred and specially fed.

Many flow measuring devices are available and could be used in conjunction with carry-away milking systems for measuring individual milk production of each cow, but such flow measuring devices as are generally available are usually difficult to clean in keeping with the normal sanitary standards of a successful dairy farm, or they are insufficiently accurate to provide adequate production records. A suitable flow measuring apparatus should be capable of being adequately cleaned by merely flushing the system, without disassembly of the measuring apparatus.

A principal object of this invention is the provision of an improved milk flow measuring apparatus for a carry-away milking system. Another object of this invention is the provision of an improved alarm device for actuating a signal to indicate when the milking of a cow is substantially complete.

A feature of the invention is the provision in a carry-away milking system of measuring apparatus including a measuring chamber having an inlet valve and an outlet valve connected by a valve stem and simultaneously and alternately opened and closed to measure equal quantities of milk flowing through the measuring system. A related feature is the provision of an indicator for totaling the quantity of milk flowing through the measuring chamber. Another related feature is the provision of a normally closed air bleed valve into the measuring chamber, with means for opening the bleed valve together with closing of the inlet valve and opening of the outlet valve to facilitate passage of milk from the measuring chamber. Still another related feature is the provision of an alarm device to signal failure of the measuring chamber to fill with milk within a predetermined period after closing of the outlet valve, indicating that the cow is milked out.

Another feature of the invention is the provision of measuring apparatus for a carry-away milking system having a milker and an evacuated milk line, the measuring apparatus having a milk receiver divided into a reservoir chamber connected with the milker, a measuring chamber, and an outlet passage connected with the evacuated milk line, with a normally open inlet valve between the reservoir chamber and the measuring chamber and a normally closed outlet valve between the measuring chamber and the outlet passage, the outlet valve opening and the inlet valve closing responsive to filling of the measuring chamber to a predetermined level for the passage of milk from the measuring chamber into the outlet passage, and a hollow valve stem connecting the inlet and outlet valves to apply vacuum from the outlet passage to the reservoir chamber and to convey the normal quantity of milk entering the reservoir chamber to the outlet passage should the reservoir chamber become filled with milk.

Additional features and advantages of the invention will be readily apparent from the following description and drawings in which:

FIGURE 1 is a vertical sectional view illustrating the measuring apparatus with an inlet valve open and an outlet valve closed, and with portions of an electric control system illustrated diagrammatically;

FIGURE 2 is an enlarged fragmentary vertical sectional view of a portion of FIGURE 1, but with the inlet valve closed;

FIGURE 3 is a perspective view of a top portion of the measuring apparatus and a valve opening tool for holding both valves partially open during washing;

Figure 4:
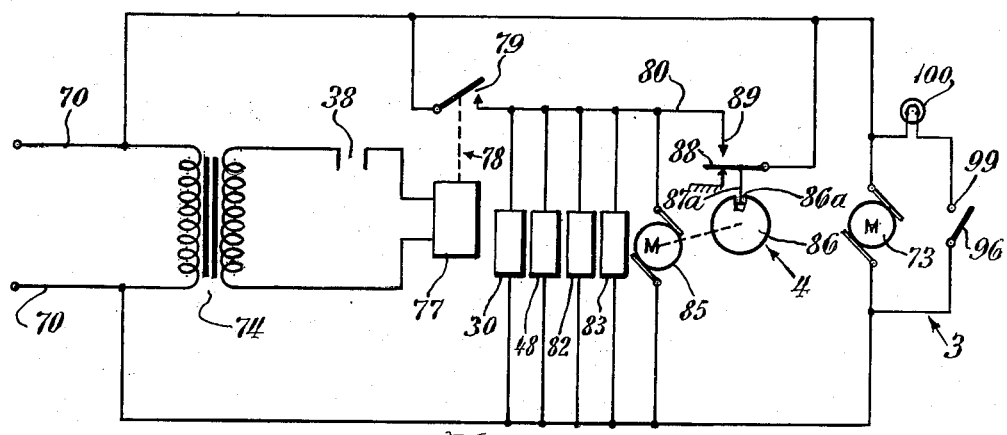
FIGURE 4 is a schematic illustration of an embodiment of the electric control system; and, FIGURE 5 is a diagrammatical illustration of an alarm device forming part of the control system.

The invention is directed to a milk measuring apparatus for carry-away milking systems in which a milk receiver has a measuring chamber which repeatedly measures equal quantiteis of milk flowing from a milker to an evacuated carry-away milk line. The measuring chamber is repeatedly filled and emptied by simultaneously and alternately opening and closing an inlet valve and an outlet valve in the measuring chamber. When the measuring chamber is full a sensing device therein actuates an electric control system which closes the normally open inlet valve, and opens the normally closed outlet valve and an air bleed into the measuring chamber for the passage of milk from the measuring chamber into the carry-away milk line. The control system also actuates an indicator for indicating the quantity of milk flowing through the measuring apparatus, and may include an alarm device for indicating when a cow is milked out. The milk receiver may be washed "in place" as by circulating washing solution through the receiver, and is so constructed that normal milking may continue although the apparatus is inoperative.

Referring to the drawings, FIGURE 1 illustrates a measuring apparatus for a carry-away milking system including a measuring means in the form of a milk receiver 1, installed between a suitable milker (not shown) and an evacuated carry-away milk line (not shown), for measuring a quantity of milk and then energizing an electric control system. The control system actuates mechanism for permitting passage of the measured quantity of milk from the milk receiver to the evacuated milk line, and an indicating device 2 providing means for indicating the quantity of milk flowing through the measuring system. Alarm means comprising an alarm device 3 is provided in the control system for indicating when the cow is milked out. A timer 4 provides a holding circuit in the control system to assure adequate time for measured quantity of milk to pass from the milk receiver, as will be more fully discussed.

The milk receiver 1 includes a hollow body 5 divided into an upper portion or reservoir chamber 6 for temporarily holding milk which ultimately flows into an intermediate portion or measuring chamber 7, and a lower portion or outlet chamber 8 which forms part of an outlet passage. An inlet valve seat 9 connects the reservoir chamber 6 and the measuring chamber 7, and an outlet valve seat 10 connects the measuring chamber 7 and the outlet chamber 8. An inlet valve 11 and an outlet valve 12 cooperate with the inlet valve seat 9 and the outlet valve seat 10, respectively, and are fixed to a valve stem 13 in such a manner that longitudinal movement of the valve stem alternately and simultaneously opens and closes the inlet and outlet valves. The valve stem 13 passes longitudinally through the center of the measuring chamber 7 and the reservoir chamber 6 and extends outwardly through an open upper end of the reservoir chamber 6 and through a flexible diaphragm 14 to which it is connected in a suitable fluid-tight manner, as by washers 15. The diaphragm 14 is clamped between a clamping ring 16 and the top of body 5 in any suitable manner as by bolts 17 to seal the open upper end of the reservoir chamber 6. Thus a fluid-tight seal is effected between the valve stem 13 and the open end of the reservoir chamber 6, and the valves 11 and 12 are free to move longitudinally in the measuring chamber 7. An adjustable spring (not shown) may be provided to urge the valve stem 13 upwardly to counterbalance the downward force resulting from vacuum beneath the diaphragm 14.

Milk from a suitable milker, which may be of the type illustrated in Thomas Patent 2,783,737, enters the reservoir chambers 6 through a supply passage 19 including a nipple 20 secured in the body 5 and receiving a suitable conduit such as a hose 21 connected to the milker.

Milk is drawn through the supply passage 19 and into the reservoir chamber 6 by vacuum introduced into the reservoir chamber from the outlet passage 22 through a hollow or tubular portion 25 of the valve stem 13. The outlet passage includes the outlet chamber 8 and the outlet nipple 23 communicating through a conduit such as hose 24 with a suitable source of vacuum such as an evacuated carry-away milk line (not shown). The tubular portion 25 of the valve stem 13 extends from the lower face of the outlet valve 12 in the outlet passage 22 to an opening 26 in the valve stem in an upper portion of the reservoir chamber 6, and terminates immediately above the opening 26. The upper end of valve stem 13 is secured to the core of a valve actuating solenoid 30 which is controlled by the electric control system to open and close the valves 11 and 12, as will be more fully described.

As may best be seen in FIGURE 2, actuating means including sensing means, in the form of a pair of electrodes 38, for actuating the electric control system responsive to filling of the measuring chamber 7, are received in an electrode passage 35 in the wall of body 5 with the inner end 36 of the passage spaced as close to the upper extremity of the measuring chamber 7 as is possible without interfering with the proper seating of inlet valve 11. The pair of electrodes 38 is secured in an electrical insulating plug 39 which is received in the outer end of the electrode passage 35 in a fluid-tight manner. The free inner ends of the electrodes 38 are contacted by milk as the level of milk rises in the measuring chamber 7, completing an electric circuit and actuating the control system.

An air bleed passage 40 in the body 5 has an inner end communicating with the electrode passage 35 and an enlarged outer end. An air bleed valve assembly 42 includes a body portion having an end received in the socket 41 in a fluid-tight manner. A passage 43 in the valve assembly 42 communicates with the air bleed passage 40 in body 5 and is closed by means of valve seat 44 and valve 45. Valve 45 is connected by valve stem 46 to the core 47 of a bleed valve solenoid 48 which is energized through the electric control system, as will be more fully described hereinafter, to open the bleed valve 45. When the bleed valve 45 is open an air bleed connection is provided from the atmosphere to the measuring chamber 7 by an exterior passage 50 opening to the atmosphere and communicating through a valve chamber 51 with passage 43 and bleed passage 40 opening into the measuring chamber. The valve 45 is constantly urged closed by a spring 53, which also maintains the valve 45 closed during pressure washing of the system.

The electric control system for the measuring device 1 is illustrated in FIGURE 4 and is energized through leads 70. A transformer 74 provides a reduced voltage between electrodes 38 in the measuring chamber 7, and as the measuring chamber 7 fills with milk a circuit is completed between the electrodes 38 energizing coil 77 of relay 78 closing contacts 79. The resistance of the control system is so adjusted that a circuit is completed between electrodes 38 only by liquid milk, and not by a milk foam or the like. Closing of contacts 79 energizes the valve actuating solenoid 30 thereby closing the inlet valve 11 and opening the outlet valve 12 in the measuring chamber 7, and the bleed valve solenoid 48 thereby opening the bleed valve 45. An alarm solenoid 82 in the alarm device 3 is also energized, as is an indicator solenoid 83 for advancing a hand 2a of the indicating device 2 for indicating the quantity of milk passing through the milk receiver 1, and a timer motor 85 is energized in the timer 4 for actuating a holding circuit. The holding circuit provides means for maintaining the inlet valve 11 closed and the outlet valve 12 opened for a sufficient period of time, preferably 3 or 4 seconds, to permit the measuring chamber 7 to empty, and during this period milk entering the milk receiver 1 through the supply passage 19 is stored in the reservoir chamber 6. When energized, the timer motor 85 rotates a cam 86 which has a low portion 86a receiving a cam follower 87a. Upon rotation of the cam 87, the follower 87a is moved upwardly closing contacts 88 and 89 to establish the holding circuit. Thus, although the circuit between electrodes 38 is broken as the level of the milk in measuring chamber 7 drops, the solenoids and timer motor remain energized until the contacts 88 and 89 open as the cam follower 87a is again seated in the low portion 86a of the cam, preferably after three or four seconds, to permit adequate time for the measuring chambers 7 to completely empty.

Figure 5:
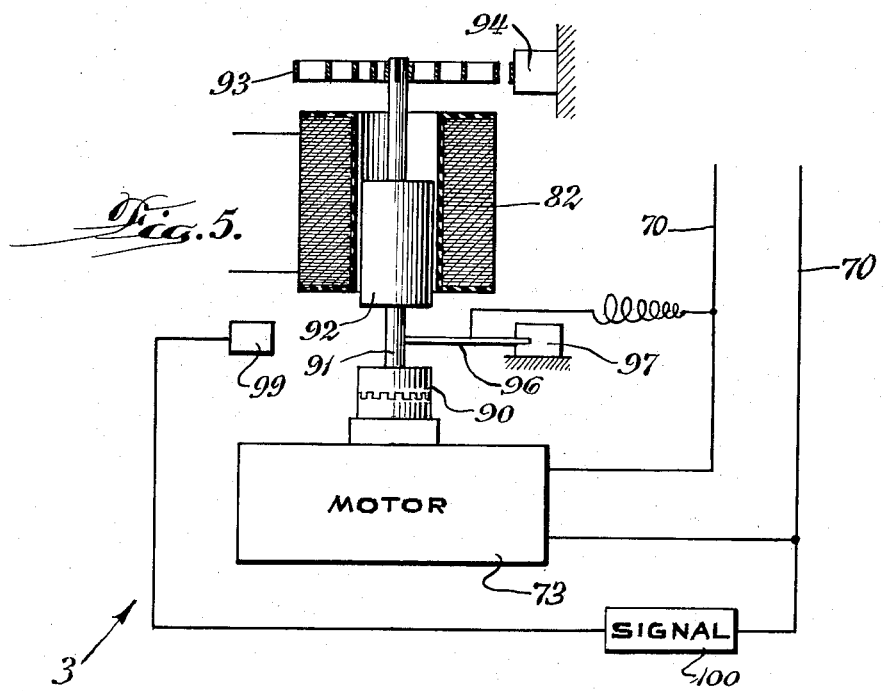

The alarm device 3, for signaling when a cow is milked out, is schematically illustrated in its entirety in FIGURE 5. When the control system is energized a motor 73, which is connected in series between the leads 70, is in constant operation and rotates a clutch mechanism 90 and shaft 91 fixed to the core 92 of the alarm solenoid 82. The shaft 91 is secured to the inner convolution of a coil spring 93, and the outer convolution of the spring is secured to a stationary support 94, so that the spring resists rotation of the shaft 91 by the motor 73. The shaft 91 is preferably of a non-conducting material and has secured thereto an arm 96 of conducting material which rotates with the shaft 91. As shown in FIGURE 5 the arm 96 is resting against the stop 97 and when rotated into engagement with a contact 99 completes a circuit through signal device 100, such as a buzzer or a bell, but preferably a flashing light, to indicate that the cow is milked out. Preferably 30 to 60 seconds are allowed for the rotation of the arm 96 from stop 97 to contact 99. When a full measure of milk is contained in measuring chamber 7, completing the circuit between electrodes 38, the alarm solenoid 82 is energized raising its core 92 and disengaging the clutch 90, whereupon the coil spring 93 rotates the arm 96 counterclockwise against the stop 97, resetting the alarm device. The timing cycle is repeated when clutch 90 is again engaged upon the breaking of the holding circuit in timer 4.

In addition to serving as means to apply a vacuum from the outlet passage to the reservoir chamber, the tubular portion 25 and the opening 26 in the valve stem are of sufficient size to carry the normal quantity of milk delivered through supply passage 19, directly into outlet passage 22, in the event that the measuring device 1 should be rendered inoperative, for example, by the valves 11 and 12 failing to open and close properly, in which event the reservoir chamber 6 will become filled with milk.

To facilitate washing of the milk receiver 1, a valve opening tool 59 is inserted between a washer 60 secured to the valve stem 13 and the clamping ring 16 on the top of hollow body 5, to partially open both the inlet valve 11 and the outlet valve 12 for the passage of washing solution through all chambers of the hollow body 5. One end of the valve opening tool 59 is formed as a handle 61 and the other end of the tool is bifurcated to provide legs 62 engaging the top of the clamping ring 16. The mid-portions of the legs 62 are inclined upwardly and provide a camming surface for engaging the washer 60. The handle portion 61 has depending legs 64 which also engage the clamping ring 16. To partially open both valves the legs 62 are positioned around the valve stem 13 and under the washer 60, with the free ends of the legs 62 and the depending handle legs 64 resting against the clamping ring 16. The handle 61 is then pushed toward valve stem 16 and the inclined portions 63 of the legs 62 urge the valve stem 13 upwardly until the washer 60 seats on a level inner portion of the legs 62. With the valves partially open, the measuring device may be washed by applying vacuum through outlet hose 24 and hollow body 5, and drawing washing solution through supply hose 21. The measuring device may alternately be pressure washed by injecting washing solution under pressure through supply hose 21 and around the partially open inlet and outlet valves in the hollow body 5 and into the outlet hose 24. During pressure washing the bleed valve 45 is maintained closed against the seat 44 by spring 53. Whether the measuring device is washed by vacuum or by pressure, the outlet valve 12 may be in the normally closed position during a portion of the washing operation for the passage of washing solution through the tubular portion 25 of the valve stem 13.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a measuring apparatus for a carry-away milking system having a milker and an evacuated milk line, the combination comprising: means for measuring milk passing through said measuring apparatus, said measuring means having a normally open inlet above a normally closed outlet, said inlet being connected with the milker and said outlet opening into the evacuated milk line; a normally closed air bleed in said measuring means; means providing a vacuum passage between said milk line and said milker; and actuating means for closing said inlet, and opening said outlet and air bleed responsive to the presence of a predetermined quantity of milk in said measuring means.

2. In a measuring apparatus for a carry-away milking system having a milker and an evacuated milk line, the combination comprising: a milk receiver; means dividing said milk receiver into a reservoir chamber connected with said milker, a measuring chamber, and an outlet passage opening into said evacuated milk line; an inlet valve above said outlet passage between said reservoir chamber and said measuring chamber; an outlet valve between said measuring chamber and said outlet passage; means normally maintaining said inlet valve open and said outlet valve closed; means providing a vacuum passage between said milker and said milk line; and actuating means substantially simultaneously and alternately opening and closing said inlet and outlet valves, respectively.

3. In a measuring apparatus for a carry-away milking system having a milker and an evacuated milk line, the combination comprising: a milk receiver; means dividing said milk receiver into a reservoir chamber connected with said milker, a measuring chamber, and an outlet passage connected with said evacuated milk line; an inlet valve between said reservoir chamber and said measuring chamber; an outlet valve between said measuring chamber and said outlet passage; and a valve stem connecting said valves, said valve stem having a tubular portion with opposite ends communicating with said outlet passage and said reservoir chamber.

4. In a measuring apparatus for a carry-away milking system having a milker and an evacuated milk line, the combination comprising: a milk receiver; means dividing said milk receiver into a reservoir chamber connected with said milker, a measuring chamber, and an outlet passage connected with said evacuated milk line; a normally open inlet valve between said reservoir chamber and said measuring chamber; a normally closed outlet valve between said measuring chamber and said outlet passage; actuating means opening said outlet valve and closing said inlet valve responsive to filling of said measuring chamber to a predetermined level; and means to apply vacuum from said outlet passage to said reservoir chamber, and to convey the normal quantity of milk entering said reservoir chamber to said outlet passage should said reservoir chamber become filled with milk.

5. In a measuring apparatus for a carry-away milking system having a milker and an evacuated milk line, the combination comprising: a milk receiver; means dividing said milk receiver into a reservoir chamber connected with said milker, a measuring chamber, and an outlet passage connected with said evacuated milk line; a normally open inlet valve between said reservoir chamber and said measuring chamber; a normally closed outlet valve between said measuring chamber and said outlet passage; actuating means opening said outlet valve and closing said inlet valve responsive to filling of said measuring chamber to a predetermined level; and means comprising a hollow valve stem connecting said inlet and said outlet valves and having openings communicating with said reservoir chamber and said outlet passage, respectively, to apply vacuum from said outlet passage to said reservoir chamber, and to convey the normal quantity of milk entering the reservoir chamber to said outlet passage should said reservoir chamber become filled with milk.

References Cited in the file of this patent

UNITED STATES PATENTS

| 2,626,385 | Schumann | Jan. 20, 1953 |
| 2,648,225 | Hemmens | Aug. 11, 1953 |
| 2,824,448 | Wier | Feb. 25, 1958 |
| 2,831,350 | Banks et al. | Apr. 22, 1958 |
| 3,078,714 | Brown | Feb. 26, 1963 |